March 13, 1928.　　　　　　　　　　　　　　1,662,547
C. URTIS
APPARATUS FOR PREPARING COFFEE AND OTHER INFUSIONS
Filed Dec. 10, 1926
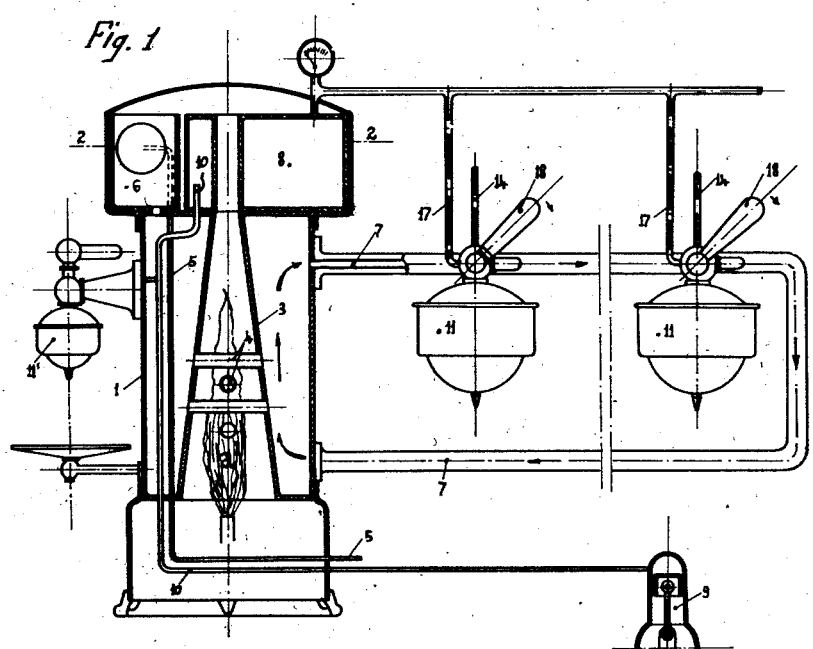
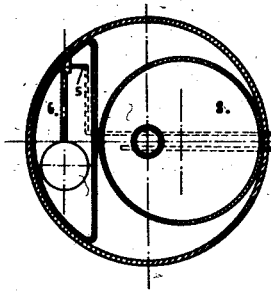
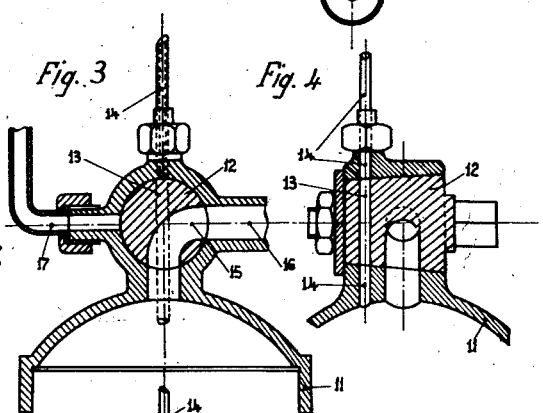
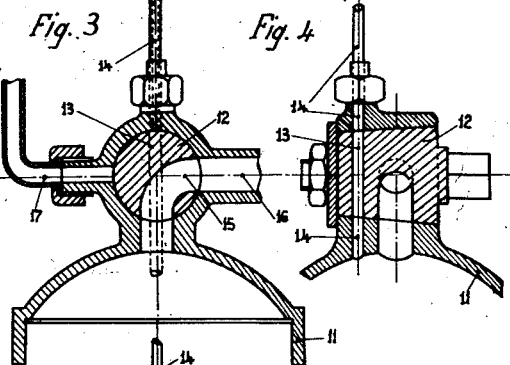
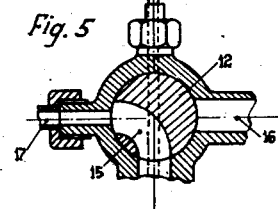
Inventor
Cesare Urtis Patented Mar. 13, 1928.

1,662,547

UNITED STATES PATENT OFFICE.

CESARE URTIS, OF TURIN, ITALY, ASSIGNOR TO GIOVANNI SARTORIO, OF TURIN, ITALY.

APPARATUS FOR PREPARING COFFEE AND OTHER INFUSIONS.

Application filed December 10, 1926, Serial No. 153,900, and in Austria November 22, 1926.

This invention relates to an apparatus for preparing coffee infusion wherein hot water at a temperature between 90 and 100° C. is brought to act upon the ground coffee and pressure air is employed for the rapid filtration of the drink.

The process used in the apparatus known heretofore for the rapid preparation of coffee drink is known under the term "express" and consists in bringing upon the powdered coffee boiling water at a temperature above 100° C. and in rapidly establishing the pressure for filtration by the action of steam, deriving for this purpose boiling water and steam from a suitable pressure boiler.

The coffee drink thus obtained has the advantage of being rapidly prepared and flavoured, but is considerably turbid owing to the resinous and tannic stuffs passed into the solution owing to the high temperature of the water and the action of the steam; it has moreover an astringent taste due to the presence of the said substances.

The apparatus according to my invention completely obviates these disadvantages and gives a perfectly clear drink, exquisite in taste and quicker in preparation than with the ordinary methods; consequently a higher efficiency of the plant and a considerable economy in working, as the production of pressure air is much cheaper than that of steam, with the advantage of doing away with pressure boilers that are always dangerous and require skilled attendance and continuous care and supervision. The elimination of steam is finally of great advantage to the rooms where coffee is made, especially if decorated with stuccos or the like.

The accompanying drawing shows diagrammatically and by way of example a constructional form of my apparatus.

Figure 1 is a general view, showing the boiler in axial vertical section with the pipings and coffee generating apparatus.

Figure 2 is a section on line 2—2 of Fig. 1.

Figures 3, 4 and 5 are views showing details of the coffee generating apparatus.

On the drawing, 1 denotes a vessel filled with water heated by a central flame 2 acting in a conical chimney 3 through which boiler tubes 4 run.

Water is fed to the vessel 1 through a pipe 5 opening into a constant level tank 6 arranged above the vessel with which it constantly communicates. A pipe 7 lined with insulating material for avoiding dispersion of heat extends from the upper end of the boiling vessel 1; water automatically circulates through said tube and returns into the vessel 1 at the lower end thereof.

Above the vessel 1 and beside the tank 6 is arranged a reservoir 8, wherein a compressor unit 9 maintains a certain air pressure which is transmitted through pipe 10.

On pipe 7 are inserted the coffee generators 11 (substantially similar to those employed in the machine known heretofore for the rapid preparation of coffee, from which, however, they differ through the supply operating arrangement); hot water, first and pressure air, next, for filtration, are brought to act upon the ground coffee in said apparatus.

The generators 11 are provided above with a valve or distributor, the plug 12 whereof has two ports 13 and 15; port 13 serving only a small air outlet tube 14, with which it comes into alignment when port 15 communicates with tube 16 branched from the hot water pipe 7, and remaining closed when port 15 comes into communication with the pressure air pipe 17 and in the closed position.

In the position shown in Fig. 1, the distributor is closed by rotating the operating lever 18 to the right, the ports come into the position shown in Fig. 3 and the hot water circulating through pipe 7 is allowed to enter the generator 11, driving away the air therein contained through port 13 and tube 14.

After filling in the hot water the lever 18 is rotated further to the right and brings the ports into the position shown in Fig. 5, in which the tubes 14 and 16 are closed and communication is established between the pressure air pipe 17 and the inside of the generator for filtering the coffee drink.

The vessel 1 can be arranged in the same or in another room as the generators 11; the number of these latter may be varied according to the importance of the plant.

One or more generators $11^1$ may be conveniently attached directly on to the vessel 1 as shown on the drawing. It is understood that the same arrangement can be used for preparing other drinks than coffee, e. g. tea and the like.

What I claim is:

1. Apparatus for the rapid preparation of infusions comprising a vessel connected with the atmosphere and adapted to heat water to a temperature below 100° C., a constant level tank communicating with said vessel, a source adapted to contain pressure air, a pipe connecting the upper and lower portion of the vessel, so as to obtain an automatic continuous circulation of the heated water, a plurality of infusion generators branched from said pipe, a three-way cock on each of said branch pipes, a pipe connecting the source of pressure air with each of said cocks so as to connect said infusion generator first with the hot water pipe and successively with the pressure air source.

2. Apparatus for the rapid preparation of infusions comprising a vessel connected with the atmosphere and adapted to heat water to a temperature below 100° C., a constant level tank communicating with said vessel and arranged in a chamber above the vessel, a pressure air reservoir arranged in said chamber, a pump for supplying pressure air to said reservoir, an infusion generator, pipes for connecting said generator with said hot water vessel and with said air reservoir, respectively and means in said conduits for supplying to said generator a given quantity of hot water and successively pressure air for filtering the drink.

3. Apparatus for the rapid preparation of infusions comprising a vessel connected with the atmosphere and adapted to heat water to a temperature below 100° C., a constant level tank communicating with said vessel and arranged in a chamber above the vessel, a pressure air reservoir arranged in said chamber, a pump for supplying pressure air to said reservoir, a pipe connecting the upper and lower portions of the hot water vessel so as to obtain an automatic continuous circulation of heated water, a plurality of generators branched from said pipe, a three-way cock on each of said branch pipes, a pipe connecting said air reservoir with each of said cocks so as to connect said infusion generator first with the hot water pipe and successively with the pressure air source.

4. Apparatus for the rapid preparation of infusions comprising a vessel connected with the atmosphere and adapted to heat water to a temperature below 100° C., a constant level tank communicating with said vessel and arranged in a chamber above the vessel, a pressure air reservoir arranged in said chamber, a pump for supplying pressure air to said reservoir, a pipe connecting the upper and lower portion of the hot water vessel so as to obtain an automatic continuous circulation of heated water, a plurality of generators branched from said pipe, a three-way cock on each of said branch pipes, a pipe connecting said air reservoir with each of said cocks so as to connect said infusion generator first with the hot water pipe and successively with the source of pressure air and means on said cocks for connecting said infusion generators with the outer air before connecting them with the hot water pipe and the source of pressure air.

In testimony that I claim the foregoing as my invention, I have signed my name.

CESARE URTIS.